(No Model.) 2 Sheets—Sheet 2.
J. N. BELL.
PLANTER OR DISTRIBUTER.
No. 512,936. Patented Jan. 16, 1894.
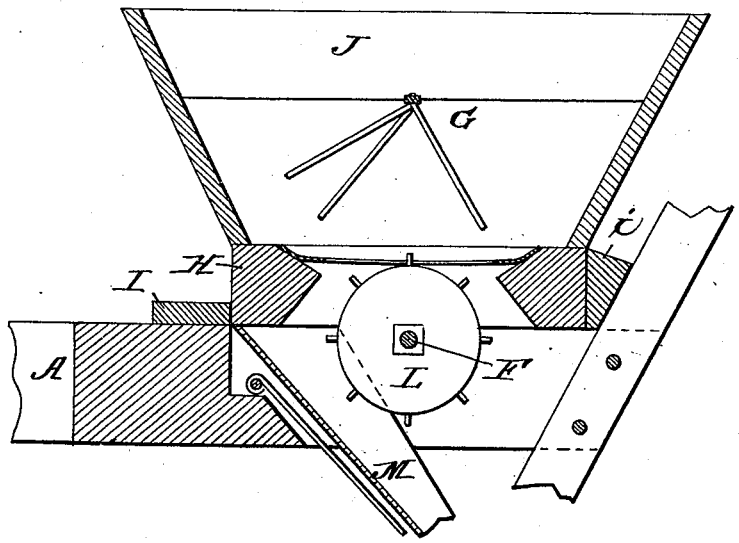
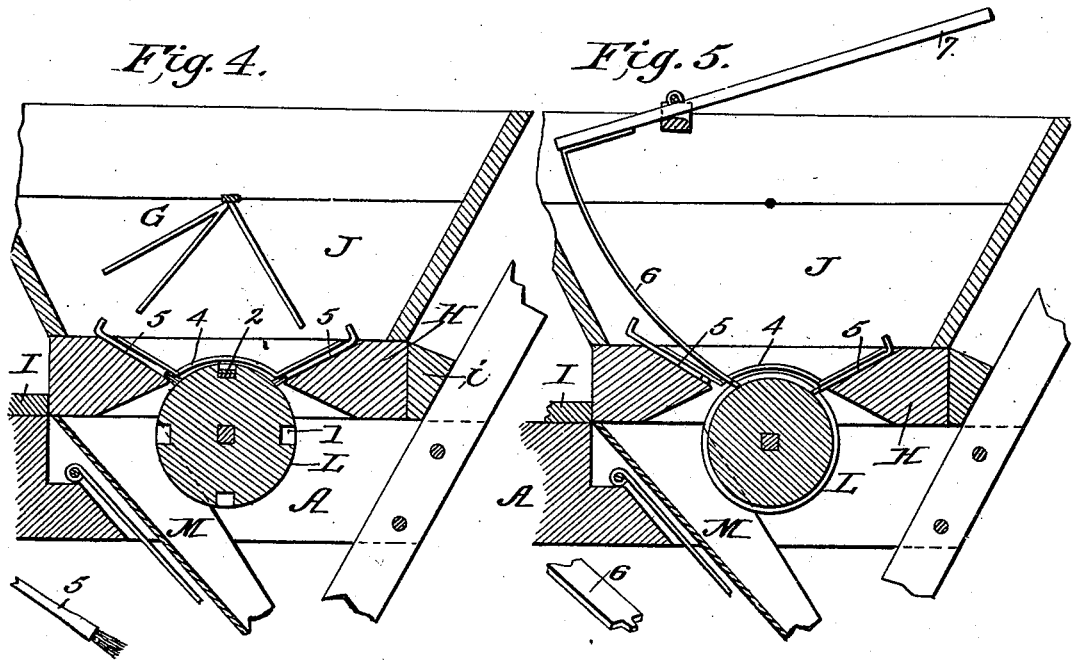
WITNESSES:
Fred G. Dieterich
P. B. Turpin.
INVENTOR
Joseph N. Bell.
BY Munn & Co.
ATTORNEYS.

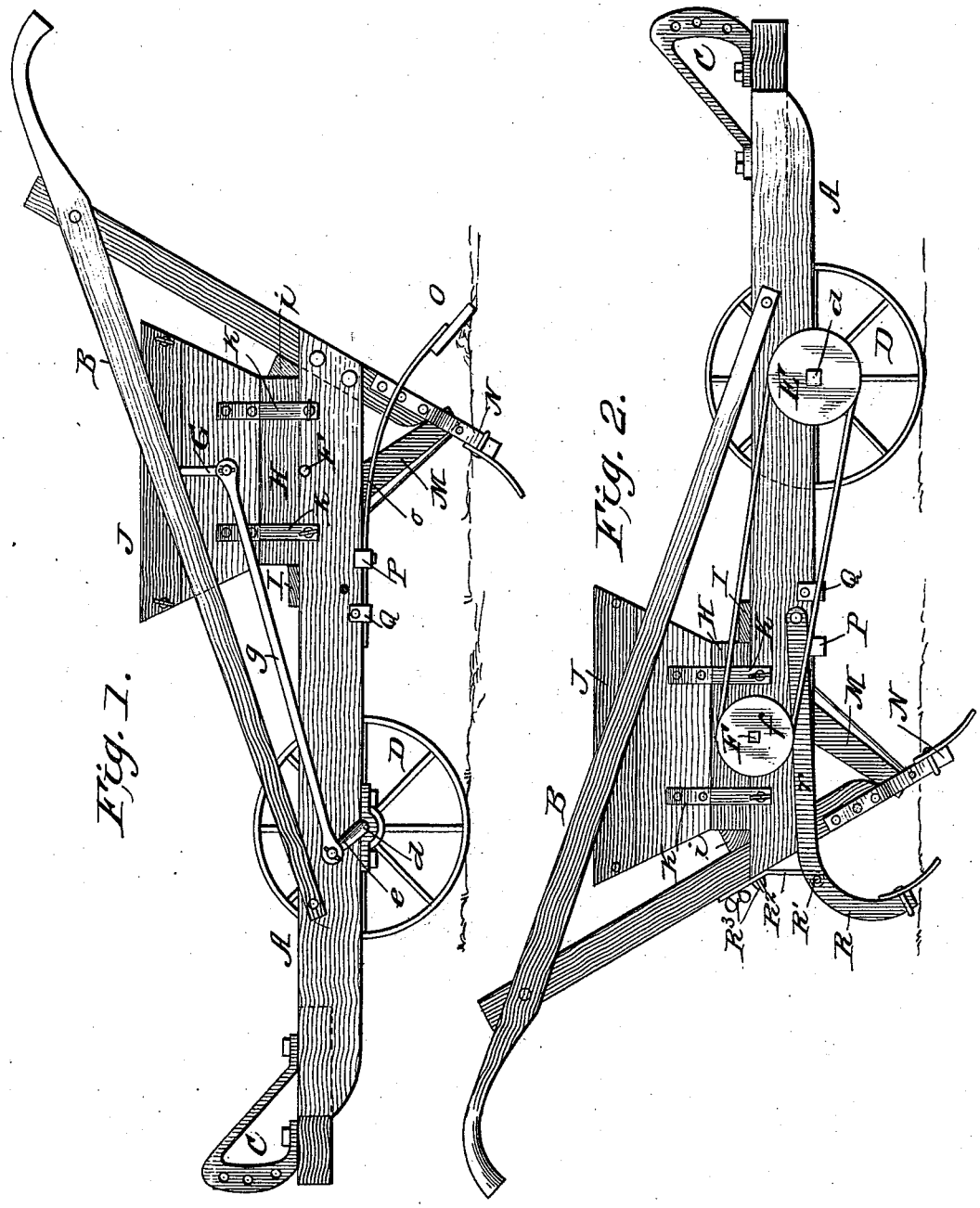

UNITED STATES PATENT OFFICE.

JOSEPH N. BELL, OF SHARP, ALABAMA.

PLANTER AND DISTRIBUTER.

SPECIFICATION forming part of Letters Patent No. 512,936, dated January 16, 1894.

Application filed July 21, 1893. Serial No. 481,127. (No model.)

*To all whom it may concern:*

Be it known that I, JOSEPH N. BELL, residing at Sharp, Pickens county, and State of Alabama, have invented a new and useful Improvement in Planters and Distributers, of which the following is a specification.

My invention is an improvement in planters and seeks to provide a simple implement which may be conveniently adjusted to serve as a planter or as a distributer for commercial fertilizer and the invention consists in the novel constructions, combinations and arrangements of parts as will be hereinafter described and pointed out in the claims.

In the drawings, Figure 1 is a side view of the machine adjusted for planting cotton. Fig. 2 is a similar view of the opposite side of the machine, the covering board being removed and the side plows applied in place thereof. Fig. 3 is a vertical longitudinal section through the hopper showing the cotton planting wheel. Fig. 4 is a similar view showing the cover and pea planting wheel, and Fig. 5 is a similar view showing the fertilizer distributing devices.

The machine frame or beam A is provided with the handles B at its rear end, the clevis C at its front end and has bearings for the axle of the master wheel D. This wheel D has its axle $d$ provided at one end with the pulley E, and at its other end with the crank $e$, the former E being belted to the pulley $f$ of the shaft F, and the crank $e$ being connected by pitman $g$ with the shaft of the stirrer G. The shaft F is journaled upon the frame A, and is held in its bearings by the bottom frame H, which rests thereon and between front and rear blocks I and $i$ and is held in place by the hopper J and its fastenings composed of straps K depending from the hopper and extending down past the bottom frame and secured to the beam or frame A preferably by winged screws or nuts as shown, so that it can be quickly removed.

For cotton seed planting the bottom frame is simply formed with a suitable opening in its bottom and the shaft F is equipped with a toothed feeding wheel L to feed the seed down through the planting tube M from which they are discharged immediately in rear of the opener N, the stirrer operating to keep the seed in the hopper properly agitated to avoid lumping and insure a smooth even discharge of the seed.

The coverer O is supported by spring or elastic arms $o$ which are inserted from the rear between a cross keeper plate P and the beam and fit between a clamp plate Q fixed in advance of the keeper plate and the beam as shown. The ends of the keeper plate may be extended laterally past the beam to serve as stops to limit the downward movement of the drag bars $r$ of the shovels R which bars are pivoted at their front ends to the beam A. I prefer when such parts are used to connect the rear ends of the drag bars $r$ by a rod R' to which is fixed a strap or plate $R^2$ having a number of openings for the screw $R^3$ which secures it to the frame so that the shovels R may be held positively in any desired position. These shovels are used in planting corn and peas and it is evident that they can be quickly substituted for the cover board when desired.

In planting peas and corn I substitute the bottom frame and the feeding wheel shown in Fig. 4 for that shown in Fig. 3. This wheel shown in Fig. 4 has a number of pockets 1, the depth of which may be adjusted by filling pieces 2 of leather or the like inserted in them and when desired these pieces may be used to entirely close some of the pockets. Thus for instance in planting peas I use all four of the pockets while in planting corn I only use two, closing the other pockets as will be readily understood. In planting corn and peas I use a bottom frame with its outlet opening formed between arched sides 4, 4, below which the pocketed wheel turns and at the ends of which I support in suitable guides the sliding cut-offs 5, having bristle or brush edges moving against the pocketed wheel and operating to prevent the outflow of seed except those contained in the pockets.

In distributing fertilizers I use a grooved wheel as shown in Fig. 5, and the same form of a bottom frame and outlet as shown in Fig. 4, but instead of using the bristle cutoffs I use simply sliding plate cutoffs as shown, to regulate the outflow and to entirely shut off the flow I use the cutoff plate 6, supported on one end of a pivoted hand lever 7 and adapted when properly adjusted to close the outlet and shut off the flow of fertilizer.

It will be seen that the implement is simple, can be easily adjusted for its several uses and will be reliable and efficient in use.

Having thus described my invention, what I claim is—

1. An implement substantially as described consisting of the beam or stock, the feeding wheel, the removable bottom frame fitting over said feeding wheel and resting upon the beam or stock the hopper and the straps secured to said hopper and extended down past the bottom frame and secured to the stock, substantially as set forth.

2. An implement substantially as described comprising the beam or stock, the blocks thereon, the interchangeable bottom frames fitting between said blocks, the hopper fitted upon said bottom frame and fastening devices by which to connect the hopper with the beam or stock, substantially as set forth.

3. In an implement substantially as described the combination of the beam or stock, the bottom frame fitted removably upon and against the said beam or stock the hopper rested upon said bottom frame and fastening devices extended between the hopper and the beam or stock all substantially as and for the purposes set forth.

4. In an implement substantially as described, the combination with the beam or stock of the keeper and clamp plates secured to the under side thereof, the clamp plate being in advance of the keeper and the coverer having its arms or shanks passed through said keeper and into engagement with the clamp, all substantially as set forth.

5. In a convertible implement substantially as described, the combination with the beam or stock of the clamp for securing the arms or shanks of the coverer and the keeper arranged in rear of said clamp and adapted to fit below such arms or shanks and extended laterally beyond the same whereby to serve as stops for the shovel drag bars substantially as set forth.

6. The convertible implement substantially as herein shown and described consisting of the beam or stock provided with the master wheel, the interchangeable feeding wheels and bottom frames, the hopper formed to fit upon said frames, the fastening devices for connecting the hopper to the beam or stock and thereby securing the bottom frame thereto and covering devices, substantially as set forth.

7. In an implement substantially as described, the combination of the beam, the blocks thereon, the bottom frame fitted removably upon the beam between said blocks, the hopper rested upon said frame and the plurality of straps arranged on opposite sides of the hopper said straps being secured at their upper ends to the hopper extended down past the bottom frame and secured at their lower ends to the beam all substantially as and for the purposes set forth.

JOSEPH N. BELL.

Witnesses:
L. B. SHARP,
GLENN HENRY.